United States Patent [19]

Sotogoshi et al.

[11] Patent Number: 4,941,923
[45] Date of Patent: Jul. 17, 1990

[54] WATER-INSOLUBLE BLACK PIGMENT

[75] Inventors: Teruhito Sotogoshi, Saitama; Yukio Ishizaka; Katsunori Nakamura, both of Tokyo, all of Japan

[73] Assignee: Nippon Kayaku Kabushiki Kaisha, Tokyo, Japan

[21] Appl. No.: 294,162

[22] Filed: Jan. 6, 1989

[30] Foreign Application Priority Data

Jan. 18, 1988 [JP] Japan .................. 63-6996

[51] Int. Cl.$^5$ .................. C08K 5/16; C08K 5/00
[52] U.S. Cl. .................. 106/498; 106/493
[58] Field of Search .................. 106/498, 493

[56] References Cited

U.S. PATENT DOCUMENTS

| | | | |
|---|---|---|---|
| 4,269,627 | 5/1981 | Hwang | 106/22 |
| 4,299,630 | 11/1981 | Hwang | 106/22 |
| 4,717,389 | 1/1988 | Seitz | 8/652 |
| 4,717,390 | 1/1988 | Dien | 8/436 |
| 4,810,254 | 3/1989 | Bauer et al. | 8/652 |

Primary Examiner—Paul Lieberman
Assistant Examiner—Christine A. Skane
Attorney, Agent, or Firm—Henry C. Nields

[57] ABSTRACT

A water-insoluble black pigment produced by reacting C. I. Solubilized Sulphur Black 1 with a salt-forming agent selected from the group consisting of inorganic acid salts of alkylamine, alkoxyalkylamine, alkanolamine, carboxyalkylamine, alkylcarboxamide, allylamine, amide of unsaturated carboxylic acid, cyclic amine, cycloalkylamine, oxacycloalkylamine, morpholine derivative, arylamine, aralkylamine, pyridine derivative, quinoline, phthalimide, DL-α-amino-ε-caprolactam and ε-aminocaprolactam, and ammonium salt of the formula (1):

$$\left[ A_1 \!-\! \underset{\underset{A_3}{|}}{\overset{\overset{A_2}{|}}{N}} \!-\! A_4 \right]^+ X^-  \quad (1)$$

wherein $A_1$, $A_2$, $A_3$ and $A_4$ each represent an alkyl or phenyl group and $X-$ represents an anionic group.

The water-insoluble black pigment is usable as a colorant for printing ink, ink for jet printers, dot printer ribbon, and melt-transfer type printer, a charge-regulator for toner used on electrostatic recording system, a laser marking agent, a colorant for resin, an infrared absorber and the like.

7 Claims, 1 Drawing Sheet

WATER-INSOLUBLE BLACK PIGMENT

BACKGROUND OF THE INVENTION

The present invention relates to water-insoluble black pigments. In particular, the present invention relates to water-insoluble black pigments produced from a specified water-soluble sulfide dyestuff and amines.

Black pigments are used in quantities in various industrial fields. For example, they are used as a colorant for paint, printing ink, ink for recording materials such as ribbon for dot printers, melt transfer ink or ink for ink-jet printers, a colorant for a toner for electrostatic photography, an infrared absorber, a laser-marking agent and a charge regulator. The black pigments include inorganic and organic pigments such as carbon black, Nigrosine dyestuffs, metal complex dyestuffs and the like.

Among them, carbon black is insoluble in ordinary organic solvents and it, therefore, is usually used in a dispersion state. Carbon black is quite liable to cause aggregation in dispersion state and various contrivances for maintaining the state of dispersion over a long period of time must be carried out. Thus the cost on using carbon black as a black pigment must be inevitably high.

Nigrosine dyestuffs are used in limited fields, since they are soluble in only some solvents and are scarcely dispersible in resins and their fastnesses to light are not enough high. In mutagenicity tests (Ames tests), Nigrosine dyestuffs give positive results in most cases.

Metal complex dyestuffs have some problems that a pure black hue can scarcely be obtained on metal complex dyestuffs and that negative results are scarcely obtained in mutagenicity tests.

Thus, the development of a water-insoluble black pigment having high solubility in ordinary solvents and excellent compatibility with a resin, and exhibiting negative results in mutagenicity tests is demanded.

After intensive investigations made for the purpose of solving the above-described problems, the inventors have completed the present invention.

SUMMARY OF THE INVENTION

The present invention provides water-insoluble black pigments produced by reacting C. I. Solubilized Sulphur Black 1 with a salt-forming agent selected from the group consisting of inorganic acid salts of alkylamine, alkoxyalkylamine, alkanolamine, carboxyalkylamine, alkylcarboxyamide, allylamine, amide of unsaturated carboxylic acid, cyclic amine, cycloalkylamine, oxacycloalkylamine, morpholine derivative, arylamine, aralkylamine, pyridine derivative, quinoline, phthalimide, DL-α-amino-ε-caprolactam and ε-aminocaprolactam, and ammonium salt of the formula (1) (hereinafter referred to as a salt-forming agent):

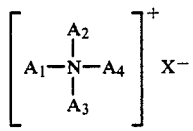

wherein $A_1$, $A_2$, $A_3$ and $A_4$ each represent an alkyl or phenyl group and $X^-$ represents an anionic group.

DETAILED DESCRIPTION OF THE INVENTION

Figure 1:
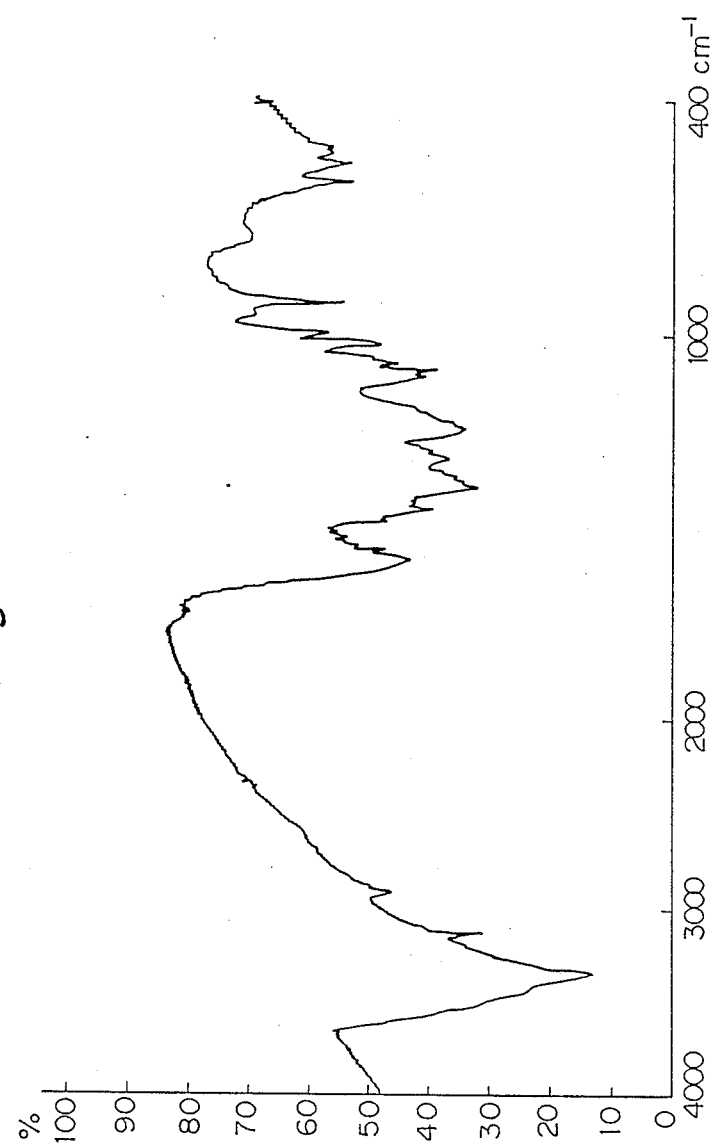
FIG. 1 shows an infrared absorption spectrum of the water-insoluble black pigment obtained in Example 4. The ordinate is percent transmittance.

Now the detailed description will be made on the water-insoluble black pigments of the present invention.

C. I. Solubilized Sulphur Black 1 used as the starting material in the present invention is produced by reducing C. I. Sulphur Black 1 with, for example, a hydrogensulfite such as sodium or potassium hydrogensulfite into a thiosulfonate. Supposedly it has the following structure:

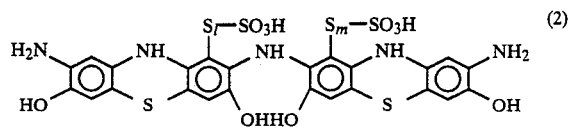

wherein l and m each represent an integer of 1 to 5.

C. I. Solubilized Sulphur Black is registered as C. I. structural formula No. 53186 on "Color Index" and put on the market under various trade names.

C. I. Sulphur Black 1 is shown by the following formula and is registered as C. I. structural formula No. 53185 on "Color Index":

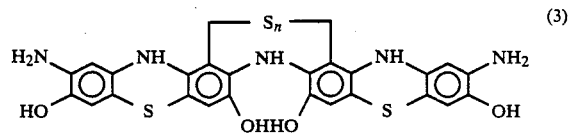

wherein n represents an integer of 2 to 10.

C. I. Solubilized Sulphur Black 1 can be produced by, for example, the following process.

A mixture of water and 2,4-dinitrochlorobenzene is heated to boil. An aqueous sodium hydroxide solution is added dropwise thereto and the mixture is stirred under heating to boil for 1 h to form 2,4-dinitrophenol. Then sodium polysulfide is added dropwise thereto over a period of 3 to 4 h while maintaining a boiling state to promote vulcanization for 24 h under exiling water.

In the course of the reaction, the reaction temperature is elevated from 106° C. to 120° C. Then, water in a quantity equal to that of the reaction liquid is added thereto and air is bubbled thereinto for about 10 h to oxidize the product and form crystals. The pH of the reaction mixture is adjusted to 9.2 to 9.5 and the reaction mixture is filtered to obtain a pressed cake of C. I. Sulphur Black 1. Water and sodium hydrogensulfite are added to the obtained pressed cake of C. I. Sulphur Black 1 and the mixture thus obtained is treated at 80° C. for 2 h. After adjusting the pH, the reaction mixture is filtered to obtain a pressed cake of C. I. Solubilized Sulphur Black 1 and the press cake is dried to form dried C. I. Solubilized Sulphur Black 1.

[As for the process for producing C. I. Sulphur Black 1, refer to "Senryo Kagaku (Dye Chemistry)" by Yutaka Hosoda, published by Gihodo, page 775 and "Ryuka Senryo to Sono Chukantai (Sulfur Dyes and Their Intermediates)" by Hachiro Hiyama, page 147].

Among the alkylamines, alkoxyalkylamines, alkanolamines, carboxyalkylamines, alkylcarboxamides, allylamines, amides of unsaturated carboxylic acid, cyclic amines, cycloalkylamines, oxacycloalkylamines, morpholine derivatives, arylamines, aralkylamine, pyridine derivatives, quinoline, phthalimide, DL-α-amino-ϵ-caprolactam, ϵ-aminocaprolactam and ammonium salts of the above formula (1), examples of the alkylamines, alkoxyalkylamines, alkanolamines, carboxyalkylamines, alkylcarboxamides, allylamines, amides of unsaturated carboxylic acid, cyclic amines, cycloalkylamines, oxacycloalkylamines, morpholine derivatives, arylamines, aralkylamines, pyridine derivatives and ammonium salts of the formula (1) include the following compounds.

Alkylamines such as
H$_2$NCH$_3$, H$_2$NC$_2$H$_5$, H$_2$NCH$_2$CH$_2$CH$_3$, H$_2$NCH(CH$_3$)$_2$, H$_2$NCH$_2$CH$_2$CH$_2$CH$_3$, H$_2$NCH(CH$_3$)CH$_2$CH$_3$, H$_2$N-C(CH$_3$)$_2$CH$_3$, H$_2$N(CH$_2$)$_{11}$CH$_3$, H$_2$NC$_{18}$H$_{37}$, CH$_3$NHC$_6$H$_{13}$, CH$_3$CH$_2$CH(CH$_3$)NH$_2$, (CH$_3$)$_3$CNH$_2$, C$_4$H$_9$CH(C$_2$H$_5$)CH$_2$NH$_2$, (CH$_3$)$_2$CHCH(CH$_3$)NH$_2$, C$_6$H$_{13}$NH$_2$, (CH$_3$)$_2$CHCH(CH$_3$)NH$_2$, [C$_4$H$_9$CH(C$_2$H$_5$)CH$_2$]$_2$NH, $_2$NCH$_3$, (C$_3$H$_7$)$_2$NH, (C$_4$H$_9$)$_2$NH, [(CH$_3$)$_2$CHCH$_2$]$_2$NH, C$_4$H$_9$CH(C$_2$H$_5$)CH$_2$N(C$_4$H$_9$)$_2$, (CH$_3$)$_2$CHCH(CH$_3$)NHC$_2$H$_5$, (C$_2$H$_5$)$_3$N, (C$_3$H$_7$)$_3$N, (C$_4$H$_9$)$_3$N, [(CH$_3$)$_2$CHCH$_2$]$_3$N, (C$_8$H$_{17}$)$_3$N and [C$_4$H$_9$CH(C$_2$H$_5$)CH$_2$]$_3$N.

Alkoxyalkylamines such as
CH$_3$OCH$_2$CH$_2$CH$_2$NH$_2$, C$_9$H$_{19}$OCH$_2$CH$_2$CH$_2$NH$_2$, C$_4$H$_9$CH(C$_2$H$_5$)CH$_2$OCH$_2$CH$_2$CH$_2$NH$_2$, C$_2$H$_5$OCH$_2$CH$_2$CH$_2$NH$_2$, C$_3$H$_7$OCH$_2$CH$_2$CH$_2$NH$_2$, (CH$_3$)$_2$CHOCH$_2$CH$_2$CH$_2$NH$_2$, C$_4$H$_9$OCH$_2$CH$_2$CH$_2$NH$_2$, (CH$_3$)$_2$CHCH$_2$OCH$_2$CH$_2$CH$_2$NH$_2$, C$_4$H$_9$CH(C$_2$H$_5$)CH$_2$OCH$_2$CH$_2$CH$_2$NH$_2$, C$_{10}$H$_{21}$OCH$_2$CH$_2$CH$_2$NH$_2$, C$_{12}$H$_{25}$OCH$_2$CH$_2$CH$_2$NH$_2$ and C$_{14}$H$_{29}$OCH$_2$CH$_2$CH$_2$NH$_2$.

Alkanolamines such as
NH$_2$C$_2$H$_4$OH, NH(C$_2$H$_4$OH)$_2$, N(C$_2$H$_4$OH)$_3$, H$_2$NCH$_2$CH(CH$_3$)OH, C$_2$H$_5$HN—C$_2$H$_4$OH, (C$_2$H$_5$)$_2$N—C$_2$H$_4$OH, HOCH$_2$NHCH$_2$CH$_2$OH, HOCH$_2$CH$_2$CH$_2$NH$_2$, HOCH$_2$CH$_2$CH$_2$N(CH$_3$)$_2$, (CH$_3$)$_2$CHCH$_2$N(CH$_2$CH$_2$OH) and CH$_3$CH(NH$_2$)CH$_2$OH.

Carboxyalkylamines such as
H$_2$N—CH$_2$COOH, H$_2$N—(CH$_3$)CHCOOH, HOOCCH(NH$_2$)CH$_2$CH$_2$COOH and H$_2$H(CH$_2$)$_{11}$COOH.

Alkylcarboxamides such as C$_2$H$_5$CONH$_2$.

Allylamines such as
CH$_2$=CHCH$_2$NH$_2$, (CH$_2$=CHCH$_2$)$_2$NH, (CH$_2$=CHCH$_2$)$_3$N, CH$_2$=CHCH$_2$N(CH$_3$)$_2$ and CH$_3$N(CH$_2$CH=CH$_2$)$_2$.

Amides of unsaturated carboxylic acid such as CH$_2$=CHCONH$_2$.

Cyclic amines such as

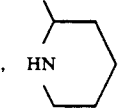

Cycloalkylamines such as cyclohexylamine and dicyclohexylamine.

Oxacycloalkylamines such as

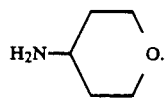

Morpholine derivatives such as

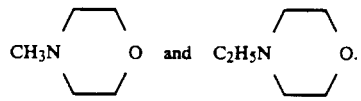

Arylamines such as

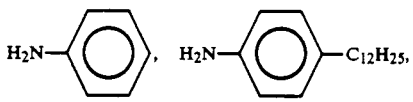

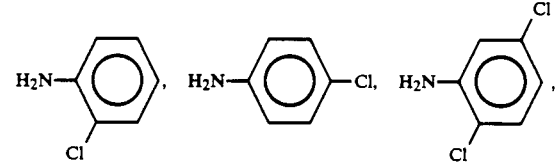

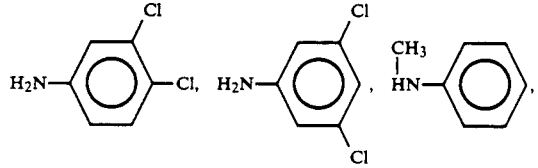

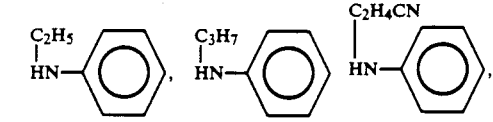

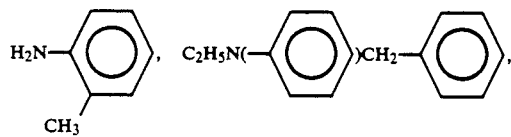

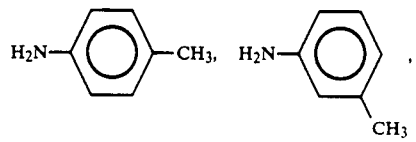

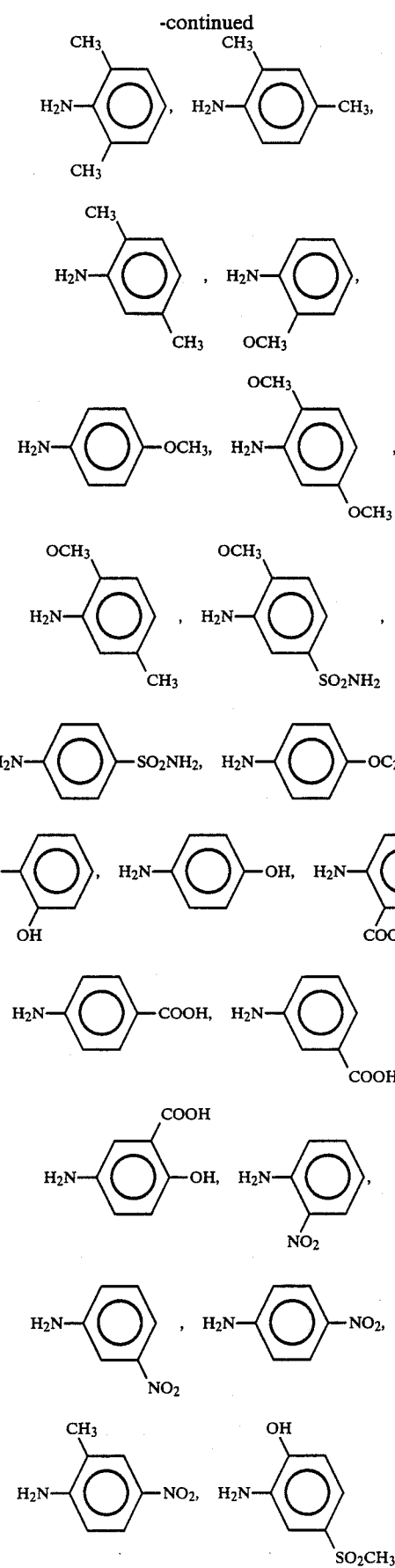
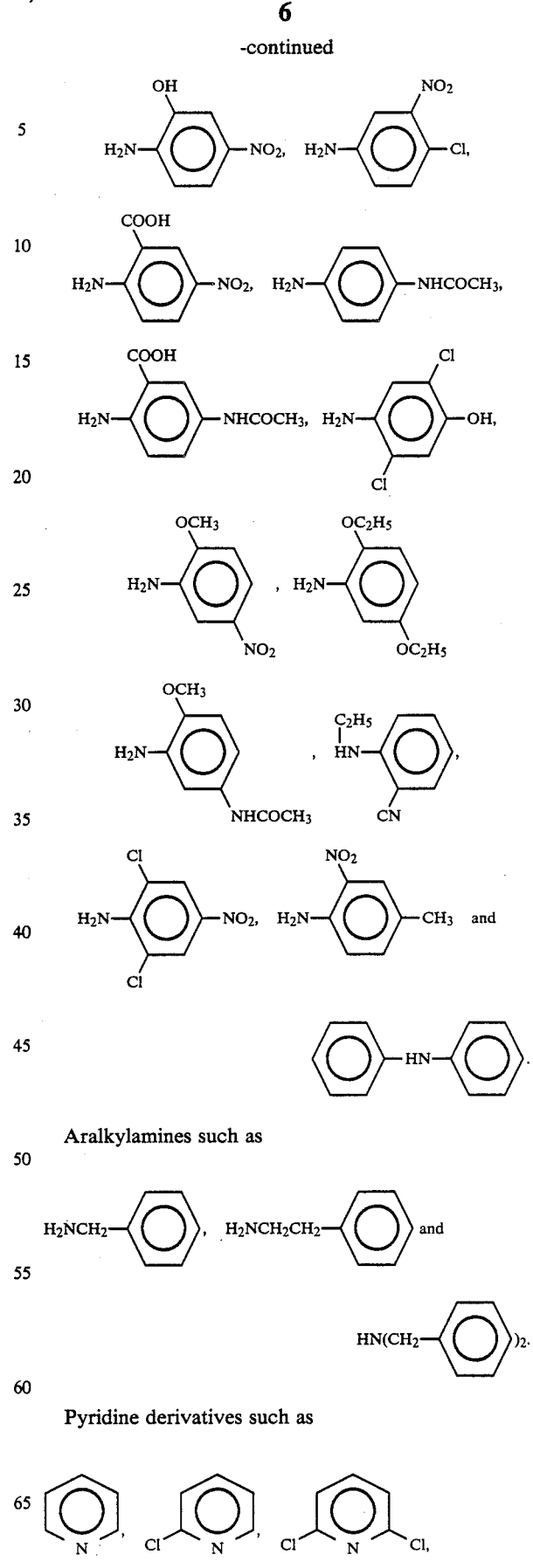
Aralkylamines such as
Pyridine derivatives such as

-continued

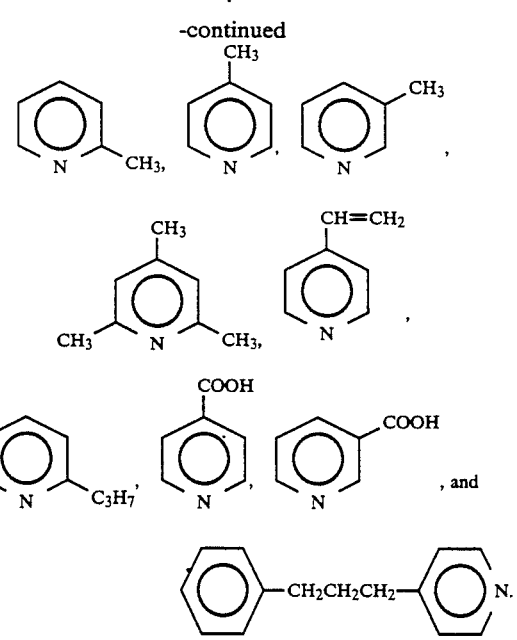

Quaternary ammonium salts such as

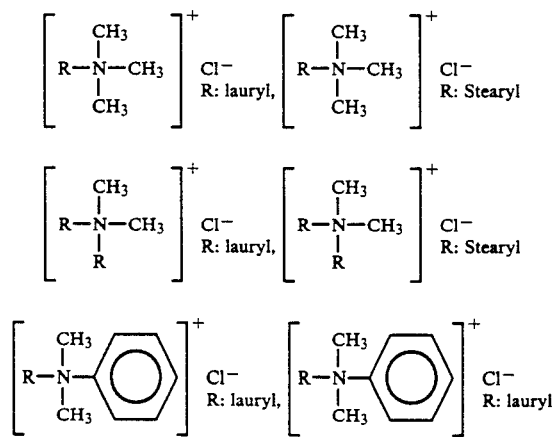

These compound can be used in an admixture of two or three compounds.

The water-insoluble black pigments of the present invention are produced, for example, as follows: when a free amine is used, it is firstly reacted with a mineral acid such as hydrochloric acid, sulfuric acid and nitric acid in water to form the mineral acid salt thereof (salt-forming agent). Then an aqueous solution of the mineral acid salt thus produced is added to an aqueous solution of C. I. Solubilized Sulphur Black 1 under stirring. C. I. Solubilized Sulphur Black 1 forms a water-insoluble salt in the form of crystals, which are separated by filtration. The intended water-insoluble black pigments can be thus obtained. The molar ratio of C. I. Solubilized Sulphur Black 1 to a mineral acid salt of an amine in the salt forming reaction may be 1:2. Since, however, the molecular weight of C. I. Solubilized Sulphur Black 1 is not always constant, the liquid mixture of them is subjected to a spot test on filter paper and the salt forming reaction can be regarded as being completed when black liquid containing C. I. Solubilized Sulphur Black no more exudes on the spot test. Although an aqueous solution of C. I. Solubilized Sulphur Black 1 can be added to an aqueous solution of a mineral acid salt of the above-mentioned amine, usually it is preferred to add a necessary amount of an aqueous solution of a mineral acid salt of the above-mentioned amine to an aqueous solution of C. I. Solubilized Sulphur Black 1 under stirring under conducting the above-mentioned spot test at times.

Although the concentrations of aqueous solutions of C. I. Solubilized Sulphur Black 1 and a mineral acid salt of the amine are not particularly limited, a concentration of each of 5 to 30 wt. % by weight is preferred from the viewpoint of workability. They are prepared at a temperature as high as, for example, 70° to 100° C. Although a salt-forming reaction between a salt-forming agent selected from the consisting of mineral acid salts of the amines and the ammonium salts of the formula (I) and C. I. Solubilized Sulphur Black 1 can satisfactorily proceed at an ambient temperature (10° to 30° C.), the temperature is not particularly limited.

When a quaternary ammonium salt is used as the salt forming agent, the step of forming the mineral acid salt is unnecessary. An aqueous solution containing a quaternary ammonium salt is produced and added to the aqueous solution of C. I. Solubilized Sulphur Black 1 in the same manner as that described above to conduct a salt forming reaction to thereby give an intended product.

The water-insoluble black pigments produced according to the present invention may be dried, if desired, to form a dry product or they may be in the form of wet cake. They are used for various purposes in either dry or wet state.

The water-insoluble black pigments produced in the present invention have pure black hue and excellent fastness to sunlight, high solubility in a solvent, high solubility or dispersibility in a resin and high absorbancy to near-infrared ray. Since these pigments contain no heavy metals, they do not pollute the environment and exhibit negative results in mutagenicity tests.

The water-insoluble black pigments of the present invention are usable for various purposes. Namely, they are usable as colorants for printing inks, inks for ink jet printers, inks for dot printer ribbons, inks for melt transfer printing, inks for infrared OCR, colorants or charge-regulators for toners for electrostatic recording, laser marking agents, colorants for resins and infrared absorbers.

For example, ink for melt transfer printing is prepared by dissolving a black pigment of the present invention and a wax having a low melting point such as a fatty acid amide in a solvent such as acetone. The ink thus prepared is applied to, for example, a polyester sheet and the sheet is heated to vaporize the solvent such as acetone, thus forming an ink layer. Thus a heat melt transfer sheet usable for the thermal transfer printing onto PPC paper or the like by printing with a thermal printing head or the like is prepared.

A water-insoluble black pigment of the present invention is mixed by grinding with epoxy resin, bromoepoxy resin, phenolic novolac, 2-methylimidazole (hardener), flame retardant, releasing agent, silane coupling agent and silica powder with a mixing roll heated at 80° C. for 10 min to form a sheet. The sheet is cooled and pulverized to give a resin molding powder. A lead frame provided with semiconductor elements is sealed with the resin molding powder thus obtained by means of a transfer press to form a satin-finished resin-sealed semiconductor device having a surface roughness of 12 μ (the molding conditions include a temperature of 175° C., a time of 2 min, a transfer pressure of 90 kg/cm² and postcure temperature and time of 175° C. and 10 h, respectively). The obtained resin-sealed semi-conductor device is irradiated with carbon dioxide laser through a given mask to mark the surface of the semiconductor device. Thus a quite clear-marked device can be obtained.

An ink-ribbon containing a water-soluble black pigment of the present invention is prepared according to a usual method, as follows. A water-soluble black pigment of the present invention is added to a vehicle prepared from mineral oil, vegetable oil, surface-active agent and etc. to obtain a mixture thereof and the mixture thus-obtained is fully mixed with a kneader or a mill having some rolls to obtain an ink-compound. The ink-compound is coated with a roll-coater on Nylon-cloth. After drying in hot-temperatured atmosphere, an ink-ribbon containing a present water-insoluble black pigment is obtained.

In these usages of the present water-insoluble black pigments, these black pigments may be used in admixture of two or more black pigments.

EXAMPLES

The following Examples will further illustrate the present invention, which by no means limit the invention. In the Examples, parts and percentages are given by weight and $D^{-2}$ represents the following structure of C. I. Solubilized Sulphur Black 1:

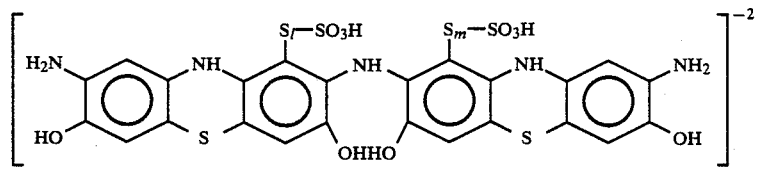

wherein l and m each represent an integer of 1 to 5.

EXAMPLE 1

50 parts of C. I. Solubilized Sulphur Black 1 (Kayasol Black B; a product of Nippon Kayaku Co., Ltd.) were dissolved in 500 parts of boiling water. A solution of 100 parts of a quaternary ammonium salt (Kohtamin 86 P Conc; a product of Kao Corporation) of the following formula in 500 parts of water was slowly added thereto under stirring:

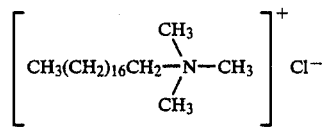

A crystallization began immediately. After the completion of the addition of the aqueous ammonium salt solution, a spot test was conducted. Coloration was scarcely observed in the exudate. The crystal thus formed was separated by filtration, washed with water and dried to give a water-insoluble black pigment of the following formula:

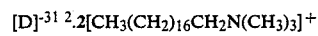

$[D]^{-31} \cdot 2[CH_3(CH_2)_{16}CH_2N(CH_3)_3]^+$

It had $\lambda_{max}$s of 606 nm in DMF and 631 nm in N-methylpyrrolidon.

EXAMPLE 2

50 parts of C. I. Solubilized Sulphur Black 1 (Kayasol Black B) were dissolved in 500 parts of boiling water. A solution of 100 parts of a quaternary ammonium salt (Kohtamin D-86 P Conc; a product of Kao Corporation) of the following formula in 500 parts of water was added dropwise thereto:

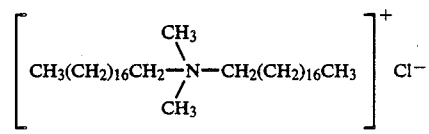

A crystallization began immediately. After the completion of the addition of the aqueous ammonium salt solution, a spot test was conducted. Coloration was scarcely observed in the exudate. The crystal thus formed was separated by filtration, washed with water and dried to give a water insoluble pigment of the following formula:

Ti $[D]^{-2} \cdot 2[(CH_2(CH_2)_{16}CH_2)_2N(CH_3)_2]^{30}$

It had $\lambda_{max}$s of 580 nm in xylene and 632 nm in N. methylpyrrolidon.

EXAMPLE 3

A water-insoluble black pigment of the following formula:

$[D]^{-2} \cdot 2[CH_3(CH_2)_{10}CH_2-N(CH_3)_3]^+$

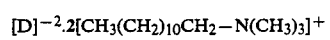

was produced from a quaternary ammonium salt (Kohtamin 24 P Conc; a product of Kao Corporation) of the following formula:

$[CH_3(CH_2)_{10}CH_2N(CH_3)_3]^+Cl^{-31}$

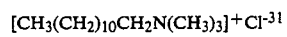

and C. I. Solubilized Sulphur Black 1. It had $\lambda_{max}$s of 609 nm in DMF and 628 nm in N-methylpyrrolidon.

EXAMPLE 4

100 parts of triethanolamine were dissolved in 500 parts of water. 100 parts of concentrated hydrochloric acid were added to the solution to give a triethanol-amine hydrochloride solution. This solution was added dropwise to a solution of 50 parts of C. I. Solubilized Sulphur Black 1 in 500 parts of boiling water under stirring. A crystallization began immediately. The crystal thus formed was separated by filtration, washed with water and dried to give a water-insoluble black pigment of the following formula:

$[D]^{-2} \cdot 2[HN(C_2H_4OH)_3]^+$

FIG. 1 shows an infrared absorption curve of this product.

EXAMPLE 5

100 parts of p-dodecylaniline were added to 500 parts of water. 100 parts of concentrated hydrochloric acid were added to the solution to give p-dodecylaniline hydrochloride solution. The solution was slowly added to a solution of 50 parts of C. I. Solubilized Sulphur Black 1 in 500 parts of boiling water under stirring. A crystallization began immediately. After the completion of the addition of the p-dodecylaniline hydrochloride solution, a spot test was conducted. No coloration was observed in the exudate. The crystal thus formed was separated by filtration, washed with water and dried to give a water-insoluble black pigment of the following formula:

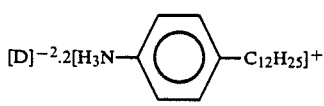

It had λmax of 569 nm in N-methylpyrrolidon.

EXAMPLE 6

100 parts of an alkoxyalkylamine of the formula $C_4H_9CH(C_2H_5)CH_2OC_3H_6NH_2$ were added to 500 parts of water and then 100 parts of concentrated hydrochloric acid were added thereto to give a solution of the amine hydrochloride. The solution was added to a solution of 50 parts of C. I. Solubilized Sulphur Black 1 in 500 parts of boiling water. A crystallization began as soon as the addition of the hydrochloride solution was begun. After the completion of the addition, a spot test was conducted. No coloration was observed in the exudate. The crystal thus formed was separated by filtration, washed with water and dried to give a water-insoluble black pigment of the following formula:

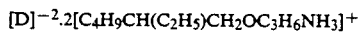

It had λmax of 625 nm in N-methylpyrrolidon. The black pigment thus obtained was subjected to the Ames tests using *Salmonella typhimurium* TA 100 and TA 98. No increase in the number of revertant colonies was observed as compared with the solvent control (blank:DMSO)

EXAMPLES 7 to 19

Water-insoluble black pigments were produced in a similar manner as that of Example 6 by using amines shown in the following table;

| Example No. | Amine used |
| --- | --- |
| Example 7 | $H_2NCH_3$ |
| Example 8 | $H_2NCH_2CH_2CH_3$ |
| Example 9 | $H_2N(CH_2)_{11}CH_3$ |
| Example 10 | $H_2NC_{18}H_{37}$ |
| Example 11 | $H_2NC_2H_4OH$ |
| Example 12 | $HN(C_2H_4OH)_2$ |
| Example 13 | $CH_3OCH_2CH_2CH_2NH_2$ |
| Example 14 | $C_9H_{19}OCH_2CH_2CH_2NH_2$ |
| Example 15 | Morpholine |
| Example 16 | Aniline |
| Example 17 | $H_2NCOOC_2H_5$ |
| Example 18 | Acrylamide polymer (MW:700,000 to 1,000,000) |
| Example 19 | DL-α-amino-ε-caprolactam |

APPLICATION EXAMPLE 1

A solution of a polyamide resin in toluene was applied to a capacitor paper having the thickness of 10 μm with a bar coater to form a layer having a thickness of 6 μm, which was then dried to form an intermediate adhesive layer. Separately, 2 parts of the water-insoluble black pigment produced in Example 6, 2 parts of a fatty acid amide as the melting point depressant, 0.8 part of carbon black having a surface coated with a vinyl chloride/vinyl acetate copolymer and 25 parts of acetone were kneaded together by means of a ball mill for 24 h to give a dispersion, which was applied on the intermediate adhesive layer, followed by evaporation of acetone to thereby form an ink layer having a thickness of 20 μm. The black pigment was quite compatible with the fatty acid amide and the vinyl chloride/vinyl acetate copolymer. The ink sheet thus prepared was used for the transfer recording onto PPC paper with a thermal facsimile terminal. The conditions were: 0.4 W for each dot of the printing head, print heating time of 4 ms and, therefore, printing energy density of 40 mj/mm². The recording was conducted repeatedly with the facsimile terminal using the same portion of the ink sheet while the recording paper was moved to have a new line each time under the above-described conditions. A print of a high density could be obtained. Even after repeating the printing 10 times, a sufficiently readable, clear print could be obtained. Even when the pattern of the characters was changed during the printing, the density of the transferred print was even. In the microscopic observation of the surface of the ink layer, it was found that the surface was flat and smooth. Even when the surface of the record was rubbed with fingers, the fingers were not stained and no dragging mark of the transferred image was observed.

| Application Example 2 | |
| --- | --- |
| Epoxy resin (epoxy equivalent: 214, softening point: 70° C.) | 16.0 parts |
| brominated epoxy resin (epoxy equivalent: 274, softening point: 84° C.) | 2.5 |
| phenolic novolac resin (epoxy equivalent: 105, softening point: 75° C.) | 8.0 |
| hardening agent (2-methylimidazole) | 0.4 |
| flame retardant (antimony trioxide) | 1.8 |
| releasing agent (carnauba wax) | 0.5 |
| silane coupling agent (A-187; a product of Nippon Unicar Co.) | 0.5 |
| water-insoluble black pigment produced in Example 4 | 0.3 |
| silica powder (inorganic filler) | 70.0 |
| Total: | 100.0 parts |

A molding epoxy resin composition comprising the components shown above was prepared as follows: the flame retardant and the inorganic filler were treated with the silane coupling agent. The other components were added thereto, pulverized and mixed together. The mixture was treated with a mixing roll heated at 80° C. for 10 min to form a sheet, which was cooled and pulverized to form a resin powder. A lead frame provided with semiconductor elements was sealed with the molding powder by means of a transfer press to form a satin-finished resin-sealed semiconductor device having a surface roughness of 20 μ (the molding conditions included a temperature of 175° C., a time of 2 h, a transfer pressure of 90 kg/cm² and postcure temperature and time of 175° C., and 10 h, respectively). The obtained resin-sealed semiconductor device was irradiated with a carbon dioxide gas laser (902 Laser Mark of Shibuya Koei Co., Ltd. having a maximum energy density of 0.4 Joule/cm$^2$) through a given mask for 1/1,000,000 sec to mark the surface of the semiconductor. Thus a quite clear marking was obtained. It was thus confirmed that the water-insoluble black pigment produced in Example 4 served as an excellent laser marking agent.

APPLICATION EXAMPLE 3

25 parts of mineral oil, 25 parts of vegetable oil, 35 parts of sorbitan fatty acid ester and 10 parts of the water-insoluble black pigment produced in Example 6 were mixed by means of a mill having three rolls for 10 minutes to obtain an ink compound. Then the ink compound was coated with a roll-coater on Nylon-cloth to obtain a ink-ribbon suitable for an impact-type printer. The ink-ribbon thus prepared was set on an impact-type printer. The printer was operated for 1,000 hours (printing test) and gave printed letters having high depth of black-shade and good luster. Degree of abrasion of wire-pins equipped on the printer was very low level.

On the other hand printing test using an ink-ribbon prepared from 25 parts of mineral oil, 25 parts of vegetable oil, 35 parts of sorbitan fatty acid ester and 10 parts of carbon black in the similar method above-mentioned was carried out and printed letters having lower depth of black-shade and worse luster were obtained. Degree of abrasion of wire-pins on this printing test is more high level.

What we claim is:

1. A water-insoluble black pigment produced by reacting C. I. Solubilized Sulphur Black 1 with a salt-forming agent selected from the group consisting of inorganic acid salts of alkylamine, alkoxyalkylamine, alkanolamine, carboxyalkylamine, alkylcarboxamide, allylamine, amide of unsaturated carboxylic acid, cyclic amine, cycloalkylamine, oxacycloalkylamine, morpholine derivative, arylamine, aralkylamine, pyridine derivative, quinoline, phthalimide, DL-α-amino-ε-caprolactam and ε-aminocaprolactam, and ammonium salt of the formula (1):

wherein $A_1$, $A_2$, $A_3$ and $A_4$ each represent an alkyl or phenyl group and $X^-$ represents an anionic group.

2. A water-insoluble black pigment according to claim 1, wherein the salt-forming agent is an inorganic acid salt of an alkoxyalkylamine.

3. A water-insoluble black pigment according to claim 2, wherein the alkoxyalkylamine is represented by the formula:

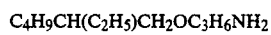

4. A water-insoluble black pigment according to claim 1, wherein the salt-forming agent is an inorganic acid salt of an alkylamine.

5. A water-insoluble black pigment according to claim 1, wherein the salt-forming agent is ammonium salt represented by the formula:

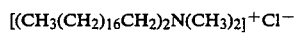

6. A water-insoluble black pigment according to claim 1, wherein the salt-forming agent is ammonium salt represented by the formula:

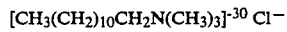

7. A water-insoluble black pigment according to claim 1, wherein a salt-forming agent is ammonium salt represented by the formula:

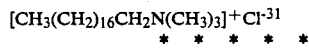

* * * * *